United States Patent
Sizemore et al.

(10) Patent No.: US 11,397,862 B2
(45) Date of Patent: Jul. 26, 2022

(54) CONFIGURING METRICS AND RECALL LEVELS FOR NATURAL LANGUAGE PROCESSING ANNOTATOR

(71) Applicant: International Business Machines Corporation, Armonk, NY (US)

(72) Inventors: Robert Christian Sizemore, Fuquay-Varina, NC (US); David Blake Werts, Charlotte, NC (US); Kristin E. McNeil, Charlotte, NC (US); Sterling Richardson Smith, Raleigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 134 days.

(21) Appl. No.: 16/936,863

(22) Filed: Jul. 23, 2020

(65) Prior Publication Data

US 2022/0027571 A1    Jan. 27, 2022

(51) Int. Cl.
*G06F 40/35* (2020.01)
*G06N 3/04* (2006.01)
*G06F 40/242* (2020.01)
*G06F 40/169* (2020.01)

(52) U.S. Cl.
CPC .......... *G06F 40/35* (2020.01); *G06F 40/169* (2020.01); *G06F 40/242* (2020.01); *G06N 3/04* (2013.01)

(58) Field of Classification Search
None
See application file for complete search history.

(56) References Cited

U.S. PATENT DOCUMENTS

| | | | |
|---|---|---|---|
| 9,311,299 B1* | 4/2016 | Petrov | G06F 40/40 |
| 9,348,815 B1* | 5/2016 | Estes | G06F 40/30 |
| 10,276,170 B2 | 4/2019 | Gruber | |
| 10,652,706 B1 | 5/2020 | Sharifi | |
| 10,990,897 B2* | 4/2021 | Zarosim | G06F 30/20 |
| 2017/0286869 A1* | 10/2017 | Zarosim | G06F 40/30 |
| 2019/0179896 A1* | 6/2019 | Anisimovich | G06N 3/084 |
| 2019/0188247 A1* | 6/2019 | Weinreb | G06F 16/14 |
| 2019/0286668 A1* | 9/2019 | Puzicha | G06F 16/93 |

(Continued)

OTHER PUBLICATIONS

Clark, A. et al. "The Handbook of Computation Linguistics and Natural Language Processing", Wiley-Blackwell (Year: 2006), 26 pages.

(Continued)

*Primary Examiner* — Douglas Godbold
(74) *Attorney, Agent, or Firm* — Cantor Colburn LLP; Kelsey M. Skodje

(57) ABSTRACT

A computer-implemented method includes receiving, by a natural language processing (NLP) annotator, an input text that is to be annotated. The method further includes determining, by the NLP annotator, a user setting that indicates an aggressiveness level of annotation to be used to annotate the input text. The method further includes selecting, by the NLP annotator, from a plurality of dictionaries, a first dictionary based at least in part on the aggressiveness level. The method further includes generating, by the NLP annotator, annotated text of the input text based at least in part on the first dictionary. The method further includes outputting, by the NLP annotator, the annotated text.

19 Claims, 11 Drawing Sheets

(56) References Cited

U.S. PATENT DOCUMENTS

2021/0342540 A1* 11/2021 Firat .................. G06F 16/3347

OTHER PUBLICATIONS

Dumitrache, A.; "Truth in Disagreement—Crowdsourcing Labeled Data for Natural Language Processing" SIKS Dissertation Series No. 2019-24 (Year:2019), 126 pages.

Dumitrache,A. et al.; "Crowdsourcing Ground Truth for Medical Relation Extraction". ACM Trans. Interact. Intell. Syst. 8, 2, Article 11 (Jun. 2018), 20 pages.

IPCOM000245410D; "Boilerplate Text Detection in Clinical Documentation" https://ip.com/IPCOM/000245410 ( Mar. 8, 2016), 5 pages.

IPCOM000246121D;"Natural language semantics in support of knowledge base searching and computer aided troubleshooting" https://ip.com/IPCOM/000246121 (May 10, 2016), 7 pages.

IPCOM000256831D;"Method and System for Automatically Generating Large-Scale Question Answering (QA) Dataset by Reusing Existing Natural Language Annotations" https://ip.com/IPCOM/000256831 (Jan. 3, 2019), 5 pages.

Maynard, et al; "Annotation and Evaluation" University of Sheffield, NLP, (Publication date Jul. 2009), 34 pages.

* cited by examiner

CONFIGURING METRICS AND RECALL LEVELS FOR NATURAL LANGUAGE PROCESSING ANNOTATOR

BACKGROUND

The present invention generally relates to computer systems, and more specifically, to configuring metrics and recall levels for a natural language processing (NLP) annotator.

NLP is concerned with the interactions between computers and human (natural) languages and how computers process and analyze large amounts of natural language data. This natural language data is sometimes referred to as a corpus or corpora. In linguistics, a corpus or text corpus is a language resource consisting of a large and structured set of texts. NLP processing can occur on large corpora resulting in many annotations associated with the corpora. Semantic search of a corpus denotes searching with meaning and/or with context, as distinguished from lexical search where the search engine looks for literal matches of the query words or variants of them without understanding the overall meaning of the query.

Semantic search seeks to improve search accuracy by understanding the searcher's intent and the contextual meaning of terms as they appear in the searchable dataspace to generate more relevant results. Semantic search systems consider various points including context of search, location, intent, variation of words, synonyms, generalized and specialized queries, concept matching, and natural language queries to provide relevant search results. Some regard semantic search as a set of techniques for retrieving knowledge from richly structured data sources like ontologies. An ontology encompasses a representation, formal naming, and definition of the categories, properties, and relations between the concepts, data, and entities that substantiate one, many, or all domains of discourse. More simply, an ontology is a way of showing the properties of a subject area and how they are related, by defining a set of concepts and categories that represent the subject.

SUMMARY

A computer-implemented method includes receiving, by a natural language processing (NLP) annotator, an input text that is to be annotated. The method further includes determining, by the NLP annotator, a user setting that indicates an aggressiveness level of annotation to be used to annotate the input text. The method further includes selecting, by the NLP annotator, from a plurality of dictionaries, a first dictionary based at least in part on the aggressiveness level. The method further includes generating, by the NLP annotator, annotated text of the input text based at least in part on the first dictionary. The method further includes outputting, by the NLP annotator, the annotated text.

In one or more embodiments of the present invention, the aggressiveness level is input specifically for the input text. Alternatively, or in addition, the aggressiveness level is a first aggressiveness level, and the method further includes receiving, by the NLP annotator, a second aggressiveness level of annotation to be used to annotate the input text, and selecting, by the NLP annotator, a second dictionary corresponding to the second aggressiveness level. Further, the method further includes generating, by the NLP annotator, the annotated text of the input text based on the second dictionary.

In one or more embodiments of the present invention, the NLP annotator is based on a neural network. The aggressiveness level changes the precision and recall of the NLP annotator. The NLP annotator determines a disambiguation score of an annotation that is generated based on a disambiguation service. Alternatively, or in addition, the NLP annotator determines a disambiguation score of an annotation that is generated based on the first dictionary.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

DETAILED DESCRIPTION

Figure 1:
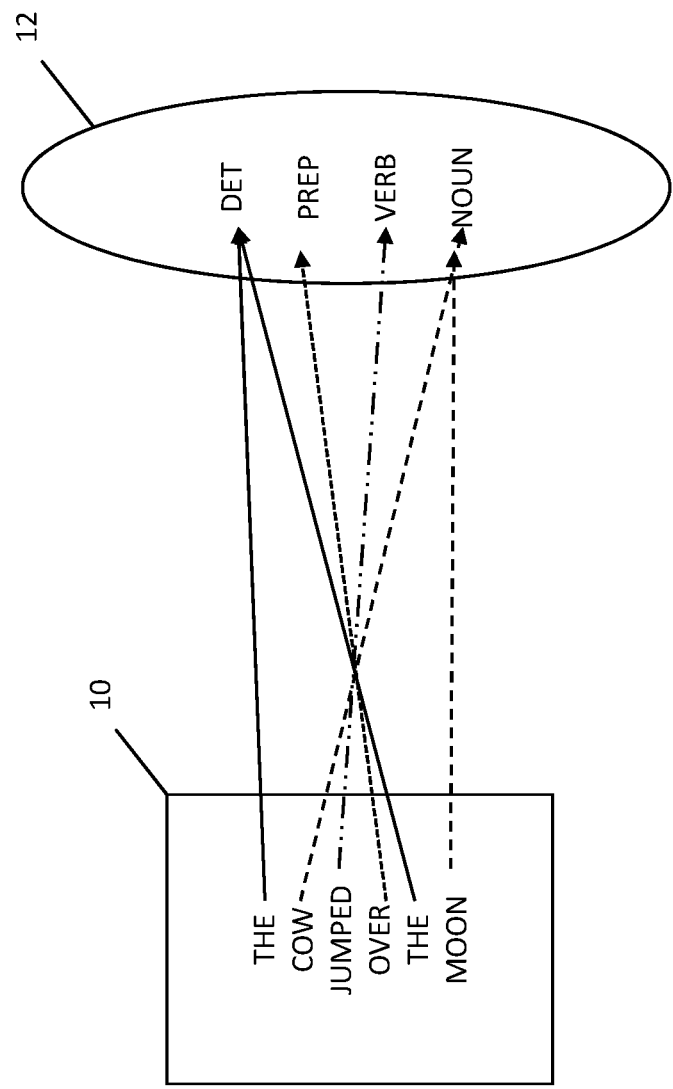
FIG. 1 depicts an example tagging of parts of speech in a sentence according to one or more embodiments of the present invention.

One or more embodiments of the present invention provide a technique of configuring metrics and recall levels for an NLP annotator. Typically, providers of an NLP service provide a one-size-fits-all NLP annotator cloud service. The providers, for example, product developers construct, train, and tune such an NLP annotator for a fictional or generic client based on an accepted ground truth data set. Generally, the NLP annotator is developed to not be too "aggressive" or not be too "conservative" when analyzing text provided to it. However, individual clients may have different needs that require a degree of configuration.

Today, computers are used to store and access "big data" that can contain information in all forms of media including texts, images, movies, and sounds. Language is the communication medium that allows humans, i.e., users, to understand the content, and to link the content to other media. However, while computers are excellent at delivering this information to interested users, it is a technical challenge to have computers to understand the language itself. NLP and various machine learning (ML) algorithms have been and are being developed to address such a linguistic technical challenge. Such linguistic modeling problems are addressed by performing ML tasks that handle big data, rather than limited to the relatively small amounts of data that humans are able to process on their own. However, to address the technical challenge of training the computer(s) to understand natural language using ML algorithms, a technical challenge to be addressed is that the data has to be prepared in such a way that the computer can more easily find patterns and inferences in it. This is usually done by adding relevant metadata to a dataset. Any metadata tag used to markup elements of the dataset is called an annotation over the input. However, in order for the algorithms to learn efficiently and effectively, the annotation done on the data must be accurate, and relevant to the task the machine is being asked to perform. For this reason, the discipline of language annotation is a critical link in developing intelligent human language technologies.

Datasets of natural language are referred to as corpora, and a single set of data annotated with the same specification is called an annotated corpus. Annotated corpora can be used to train ML algorithms. ML algorithms can be used for various NLP applications including, but not limited to question answering systems (QAS), summarization, machine translation, speech recognition, and document classification. As one example of the increasing availability of data, Google has recently released the Google Ngram Corpus. The Google Ngram dataset allows users to search for single words (unigrams) or collocations of up to five words (5-grams). N-grams are sets of items (often words, but they can be letters, phonemes, etc.) that are part of a sequence. By examining how often the items occur together their usage in a language can be determined, and predictions can be made about what would likely follow a given sequence (using n-grams for this purpose is called n-gram modeling). N-grams are applied in a variety of ways every day, such as in websites that provide search suggestions once a few letters are typed in, and for determining likely substitutions for spelling errors. They are also used in speech disambiguation—if a person speaks unclearly but utters a sequence that does not commonly (or ever) occur in the language being spoken, an n-gram model can help recognize that problem and find the words that the speaker probably intended to say.

The Ngram dataset consists of more than one trillion tokens (words, numbers, etc.) taken from publicly available websites and sorted by year. Another modern corpus is ClueWeb09 (http://lemurproject.org/clueweb09.php/), a dataset "created to support research on information retrieval and related human language technologies. It consists of about 1 billion web pages in ten languages that were collected in January and February 2009." This corpus is too large to use for an annotation project (it's about 25 terabytes uncompressed), but some projects have taken parts of the dataset (such as a subset of the English websites) and used them for research (Pomikalek et al. 2012). Data collection from the Internet is an increasingly common way to create corpora, as new and varied content is always being created. With so much data, annotating such corpus is a computationally intensive task, and not a task that is practically performed by a human.

To further add to the complexity, different parts of a language's syntax can be annotated. These include part of speech (POS), phrase structure, and dependency structure. There are many different tag sets for the parts of speech of a language that you can choose from.

The POS tagging process involves assigning the right lexical class marker(s) to all the words in a sentence (or corpus). This is illustrated in by a POS tagging example shown FIG. 1. Here words from a sentence 10, "The cow jumped over the moon," are tagged using a set of tags 12 that identify the separate POS. Identifying the correct parts of speech in a sentence is a necessary step in building many natural language applications, such as parsers, Named Entity Recognizers, QAS, and Machine Translation systems. It is also an important step toward identifying larger structural units such as phrase structure. It is understood that although the examples described herein use the English language, similar annotation can be performed for corpus in other languages.

Figure 2:
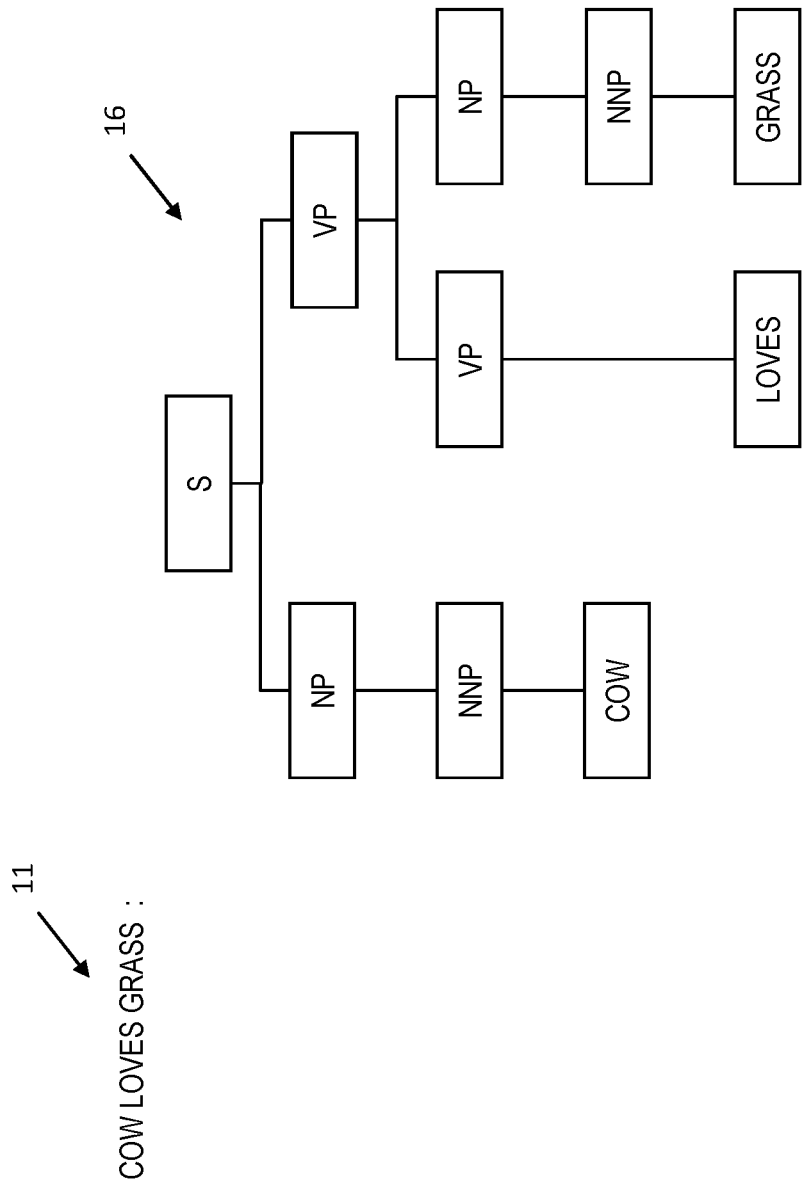
FIG. 2 depicts a bracketed representation of a syntactic tree structure according to one or more embodiments of the present invention.

While words in a sentence can be annotated with labels (the POS tags 12), specific sequences of words can also be annotated, using syntactic bracketing (or labeling). The syntactic bracketing determines the structure that organizes all the words into coherent phrases. Here, "syntax" is the name given to the structure associated with a sentence. The syntactic bracketing provides two relations between the words in a sentence: order (precedence) and hierarchy (dominance). FIG. 2 depicts a bracketed representation of a syntactic tree structure. In the depicted example, the tree 16 captures the precedence and dominance relations for a sentence 11 "Cow loves grass." The precedence and dominance relations in this case (using the standard Penn Treebank's notation) are:

{Dom(NNP1,Cow), Dom(VPZ,loves), Dom(NNP2,grass), Dom(NP1,NNP1), Dom(NP2,NNP2), Dom(S,NP1), Dom(VP,VPZ), Dom(VP,NP2), Dom(S,VP), Prec(NP1,VP), Prec(VPZ,NP2)}

It is understood that other types of syntactic bracketing can be performed that is different from the examples herein.

Figure 3:
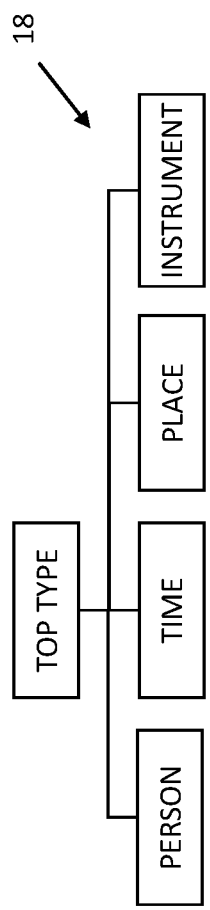
FIG. 3 depicts an example ontology that is used to annotate an input according to one or more embodiments of the present invention.

In addition to POS tagging and syntactic bracketing, it is useful to annotate texts in a corpus for their semantic value, that is, what the words mean in the sentence. Typically, two kinds of annotation are performed for semantic content within a sentence: what something is ("semantic typing"), and what role something plays ("semantic role"). FIG. 3 depicts an example ontology that is used to annotate an input. It is understood that the example ontology 18 that is depicted only contains four different labels for illustration purposes, however, typical ontologies that are used by one or more embodiments of the present invention can include thousands, or even more labels, making it very difficult, if not impractical, to perform annotation manually, particularly with a large corpus. For example, the ontology 18 applied to a sentence "Mary played guitar in the park at 6 pm" provides: $[Mary]_{person}$ played $[guitar]_{instrument}$ in $[the\ park]_{place}$ at $[6\ pm]_{time}$.

It should be noted that the ontology used by an annotator varies based on the domain in which the NLP system is being used. For example, the ontology for an annotator that is tagging/labelling/identifying parts of a corpus in the pharmaceutical field will vary from another ontology that is used to distinguish whether email messages are spam or not.

Although it is recognized as a technical challenge to configure an NLP annotator specifically for the domain in which an NLP system is being used, existing systems do not facilitate such dynamic configurations. Instead, the NLP annotator is preconfigured by the product developers, and typically, the users (e.g., consumers) of the NLP system adapt based on the annotations provided by the NLP system. For example, using an NLP system based on annotations based on systems like RxNorm (US-specific terminology in medicine that contains all medications available on the US market) or Unified Medical Language System (UMLS, which is a compendium of many controlled vocabularies in the biomedical sciences), both "Program" and "Prompt" are drug brands, and "pineapple" is a drug ingredient. Because those terms may appear more often in non-drug-related situation, NLP annotators may often ignore these terms during analysis of a corpus to increase "precision scores" and sacrificing "recall scores."

The precision and recall scores are attributes to measure the performance of an NLP system, i.e., how well or poorly the NLP system is performing. The NLP system's primary function is to classify words or phrases encountered in input text into one or more categories for which the NLP system is configured based on the domain in which the NLP system operates, for example, medical field, pharmaceutical field, sports field, entertainment field, etc. Based on a number of true positives (tp), true negatives, (tn), false positives (fp), and false negatives (fn), one or more attributes of the NLP system are measured. Particularly, Precision $P=tp\div(tp+fp)$. The precision is, thus, a relation between true positives and the total number of true positives and false positives. Further, Recall $R=tp\div(tp+fn)$. The recall is a relation between true positives to the total number of true positives and false negatives. The accuracy of the annotator can be computed as Accuracy $A=(tp+tn)\div(tp+tn+fp+fn)$.

Another metric that is used to quantify the performance of the annotator is an "F-measure." The values of P and R are typically combined into a single metric called the F-measure, which is the harmonic mean of the two: $F=2\times(P\times R)\div(P+R)$.

Typically, the product developers preconfigure the annotator to be "balanced" so that the P and R values are within a predetermined range. However, depending the field in which the annotator is used, the user may prefer to have the P, the R, or both to be at different levels. In other words, the technical challenge is that user wants to adjust the annotator to be more "aggressive" or "conservative" in terms of trying to decide if an element (word, phrase, entity) from the corpus should be annotated. A particular user may have a need where "every" instance of a term being mentioned (higher recall, lower precision) is annotated while other users may only want "accurate" hits and can afford to let some terms pass through unannotated (lower recall, higher precision).

One or more embodiments of the present invention address such technical challenges and provide an annotator that facilitates adjusting the precision and recall values by the user.

Figure 4:
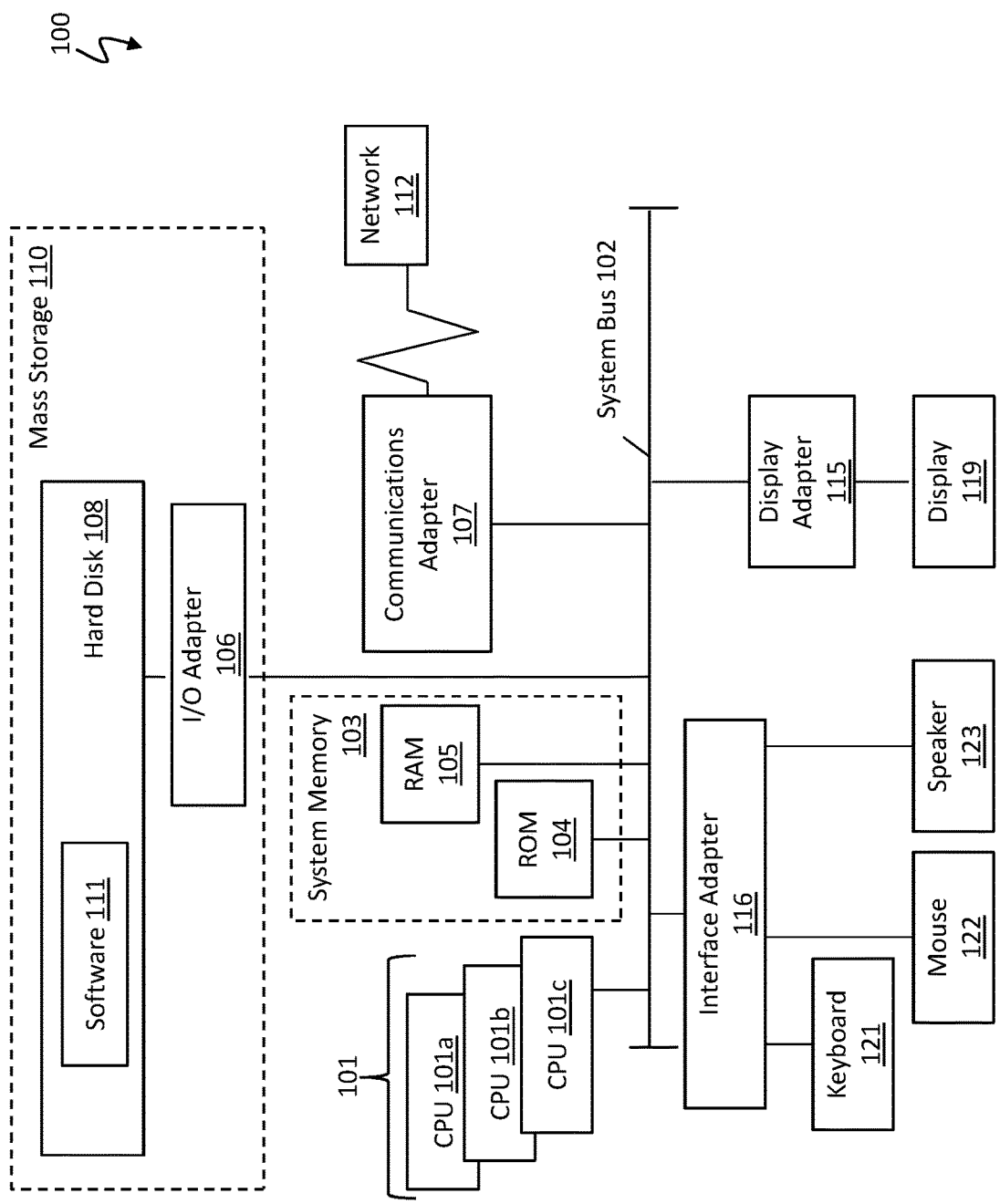
FIG. 4 depicts a block diagram of an example computer system for use in conjunction with one or more embodiments of the present invention.

Turning now to FIG. 4, a computer system 100 is generally shown in accordance with one or more embodiments of the invention. The computer system 100 can be an electronic, computer framework comprising and/or employing any number and combination of computing devices and networks utilizing various communication technologies, as described herein. The computer system 100 can be easily scalable, extensible, and modular, with the ability to change to different services or reconfigure some features independently of others. The computer system 100 may be, for example, a server, desktop computer, laptop computer, tablet computer, or smartphone. In some examples, computer system 100 may be a cloud computing node. Computer system 100 may be described in the general context of computer system executable instructions, such as program modules, being executed by a computer system. Generally, program modules may include routines, programs, objects, components, logic, data structures, and so on that perform particular tasks or implement particular abstract data types. Computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, the computer system 100 has one or more central processing units (CPU(s)) 101a, 101b, 101c, etc., (collectively or generically referred to as processor(s) 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and may include a basic input/output system (BIOS) or its successors like Unified Extensible Firmware Interface (UEFI), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, which may be any appropriate operating system to coordinate the functions of the various components shown in FIG. 4.

Additional input/output devices are shown as connected to the system bus 102 via a display adapter 115 and an interface adapter 116. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by the display adapter 115, which may include a graphics controller to improve the performance of graphics intensive applications and a video controller. A keyboard 121, a mouse 122, a speaker 123, etc., can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI) and the Peripheral Component Interconnect Express (PCIe). Thus, as configured in FIG. 4, the computer system 100 includes processing capability in the form of the processors 101, and, storage capability including the system memory 103 and the mass storage 110, input means such as the keyboard 121 and the mouse 122, and output capability including the speaker 123 and the display 119.

In some embodiments, the communications adapter 107 can transmit data using any suitable interface or protocol, such as the internet small computer system interface, among others. The network 112 may be a cellular network, a radio network, a wide area network (WAN), a local area network (LAN), or the Internet, among others. An external computing device may connect to the computer system 100 through the network 112. In some examples, an external computing device may be an external webserver or a cloud computing node.

It is to be understood that the block diagram of FIG. 4 is not intended to indicate that the computer system 100 is to include all of the components shown in FIG. 4. Rather, the computer system 100 can include any appropriate fewer or additional components not illustrated in FIG. 4 (e.g., additional memory components, embedded controllers, modules, additional network interfaces, etc.). Further, the embodiments described herein with respect to computer system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 5:
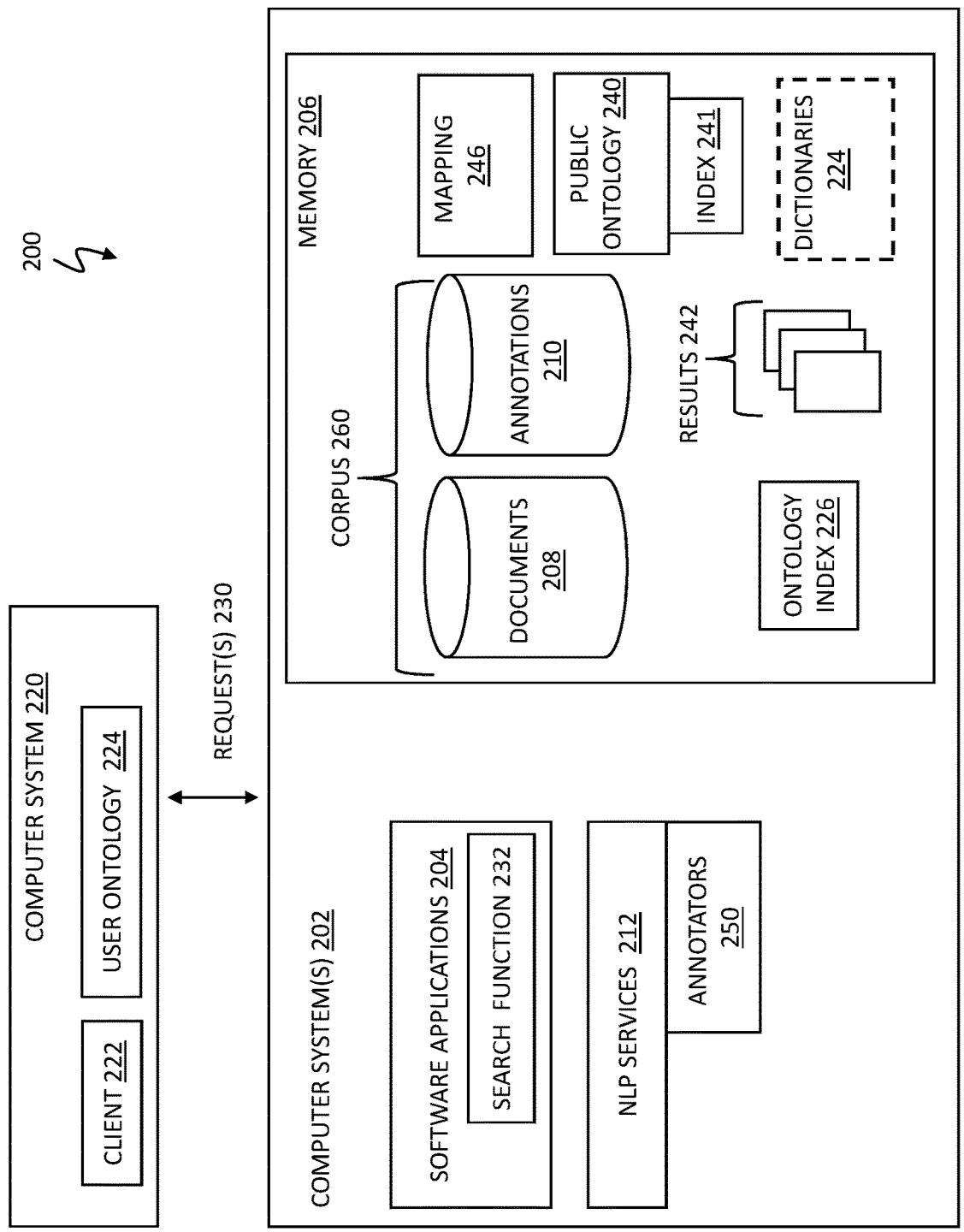
FIG. 5 depicts a block diagram of a system for configuring an annotator in accordance with one or more embodiments of the present invention.

FIG. 5 is a block diagram of a system 200 for replacing mappings within a semantic search application over a commonly enriched corpus in accordance with one or more embodiments of the present invention. FIG. 5 depicts one or more computers systems 202 coupled to computer system 220. Computer systems 202 can be representative of numerous computers in a datacenter servicing various users. Computer system 220 can be representative of numerous user computers requesting customized access to resources on computer systems 202. Elements of computer system 100 may be used in and/or integrated into computers system 202 and computer system 220.

Figure 6:
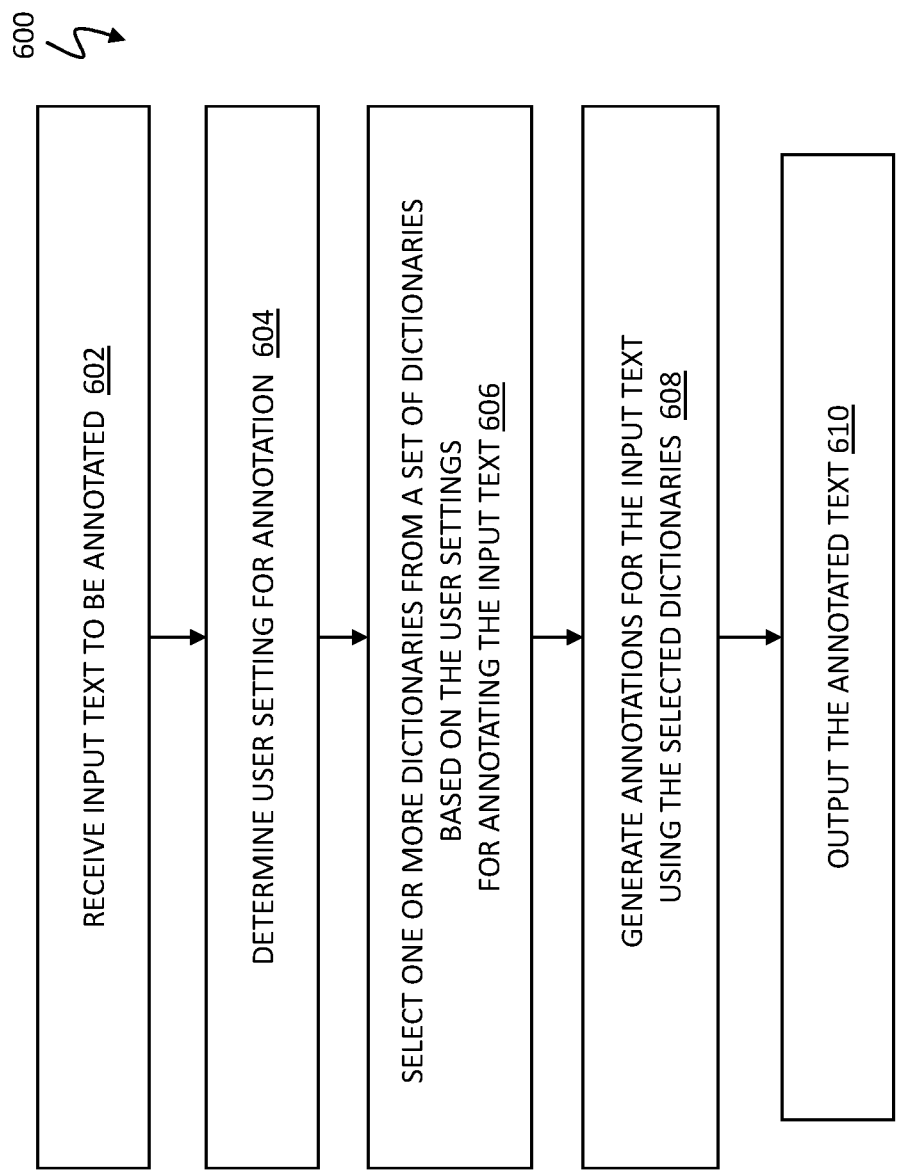
FIG. 6 illustrates a flowchart of a method for configuring precision and recall levels for annotating an input text in accordance with one or more embodiments of the present invention.

FIG. 6 illustrates a flowchart of a method for configuring metrics and recall levels for one or more NLP annotators in accordance with one or more embodiments of the present invention. The method 600 is now described with reference to FIG. 5.

At block 602, software application 204 on computer system 202 is configured to receive one or more requests 230 for annotating text, referred herein as the "input text." The requests 230 can be internal to the computer system 202. Alternatively, the requests 230 can be from a separate computer system 220. Computer system 220 can be a system for the user, who may also be referred to as the customer, client, etc. Computer system 220 can communicate with computer systems 202 over a wired and/or wireless network. Using computer system 220, the user can interface directly with software application 204 of computer system 202 and/or use a client application 222 to interface with software application 204. Software application 204 may be implemented as software 111 executed on one or more processors 101, as discussed in FIG. 4. Similarly, client application 222 may be implemented using software 111 configured to execute on one or more processors 101. Client application 222 may include cookies, plug-ins, etc., and client application 222 may serve as a piece of computer software that accesses the NLP services 212 for corpus 260 made available by computer system 202.

Corpus 260 on computer system 202 is available to the public for semantic search in which one or more ontologies 240 are used for the semantic search. Corpus 260 has been enriched by one or more NLP services 212 using one or more ontologies 240. Corpus 260 includes databases of numerous documents 208 and annotations 210 about those documents 208. Corpus 260 may contain hundreds, thousands, and/or millions of documents, also referred to as "big data". In accordance with one or more embodiments, the enormous size of corpus 260 requires management, processing, and search by a machine (such as computer system 202), for example, using computer-executable instructions, and corpus 260 could not be practically managed, stored, analyzed, and/or processed as discussed herein within the human mind.

For corpus 260, NLP processing via one or more NLP services 212 using annotators 250 has occurred on documents 208 resulting in annotations 210 associated with the text of documents 208. NLP services 212 used one or more ontologies 240 to generate annotations 210 thereby enriching corpus 260. Ontologies 240 represent one or more public and/or private ontologies that are to be used with corpus 260. To enrich corpus 260, NLP services 212 are configured to index the documents 208, and while using the index of documents 208 along with public ontologies 240, NLP services 212 are configured to find insights and relationships in the text of documents 208 and output this information as annotations 210 (or metadata) associated with documents 208.

The rule-based annotators 250 use a set of one or more dictionaries 224 to initiate the annotator analysis. A dictionary 224 includes the tags 12 that are to be used by the annotators 250 when determining one or more parts of the input text. Typically, depending on the subject for which the NLP system 202 is being used, the annotators 250 is configured to use a single dictionary where all possible tags 12 are stored. For example, in the case that the annotators 250 are being used to determine pharmaceuticals, their use in treatments of specific diseases, the dictionary 224 specifically includes tags 12 for terms used in this context. For example, the dictionary 224 can be DRUG_NAMES, where all possible drug names/brands are stored.

To address the technical challenge of allowing the user to configure the precision and recall values, one or more embodiments of the present invention facilitate the annotator 250 to determine a user setting for the annotation to be performed, at block 604. The user setting can indicate a level of aggressiveness when annotating the input text. The level of aggressiveness dictates the precision value and the recall value of the resulting annotation. The user settings can be part of the input request, or a separate input from the user. Alternatively, the user settings can be stored on the computer system 202. The level of aggressiveness can be represented by a numeric value. For example, in a system that has 3 separate dictionaries 224 at different ambiguity levels, the level of aggressiveness can be 0=most aggressive, 1=medium aggressive, and 2=least aggressive. It is understood that other representations can be used for the level of aggressiveness in the computer system 202. It is also understood that in other embodiments of the present invention, the number of levels of aggressiveness can be different from the three levels described in the above example.

Further, the method 600 includes selecting one or more dictionaries 224 for determining the annotations 210 to associated with the input text, at block 606. The selection is based on the user settings so that the appropriate level of aggressiveness is used for the annotations 210. The dictionaries 224 can be divided into several levels, each level including tags 12 of a particular ambiguity level. For example, in the above example of the pharmaceutical domain, the drug name/brand dictionaries can include a first (base-level) dictionary where never-ambiguous terms can reside. Moderately ambiguous terms can reside in a second dictionary, and ambiguous terms can reside in a third dictionary. The annotator 250 can select the one or more dictionaries 224 to use during the annotation analysis based on the user settings. The dictionaries are provided by product developers and/or the user and are assigned the ambiguity level manually.

By selecting the different dictionaries, the precision and recall values of the generated annotation changes. For example, selecting the third dictionary, with the most ambiguous terms, the resulting annotation will be most aggressive, i.e., high recall, but low precision, whereas, by using the first dictionary, the resulting annotation will be most conservative, i.e., high precision, but low recall.

The annotator 250 analyzes the input text using the selected number of dictionaries 224, by parsing rule implementations and generating the annotations 210 for the input text, at block 608. The annotator 250 can use neural networks, types of disambiguation modules, etc. that generate the annotations 210 for the input text using the selected dictionaries 224. The annotator 250 returns annotated text back to the computer system 220 with the matching annotations 210, at block 610. Further, software application 204 can utilize one or more portions of annotations 210 when performing one or more operations.

Figure 7:
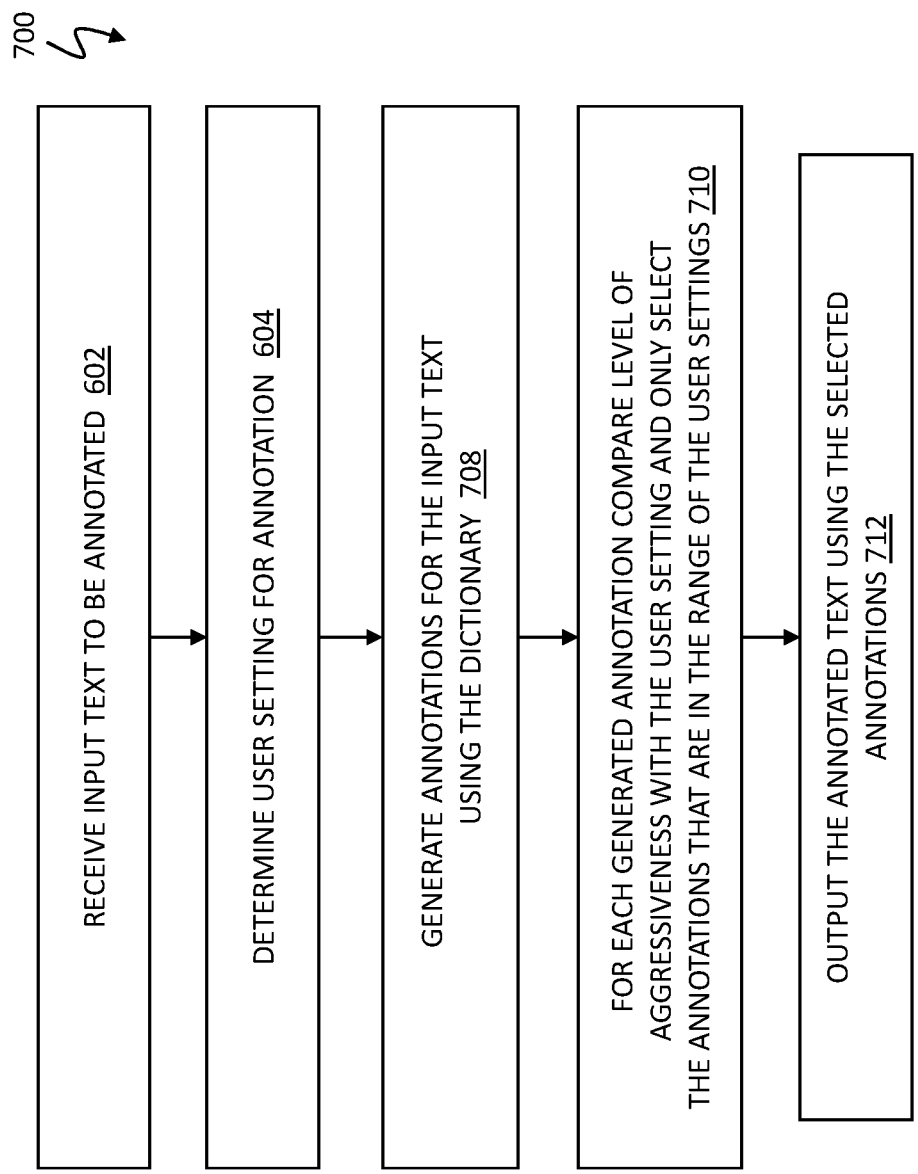
FIG. 7 illustrates a flowchart of a method for configuring precision and recall levels for annotating an input text in accordance with one or more embodiments of the present invention.

FIG. 7 depicts a flowchart of a method 700 for configuring metrics and recall levels for one or more NLP annotators in accordance with one or more embodiments of the present invention. The method 700 includes the operations 602 and 604 as described herein. In this method, the annotator 250 uses a single dictionary 224. The dictionary 224 includes an additional column that includes a level of aggressiveness associated with each tag 12 in the dictionary 224.

Figure 8:
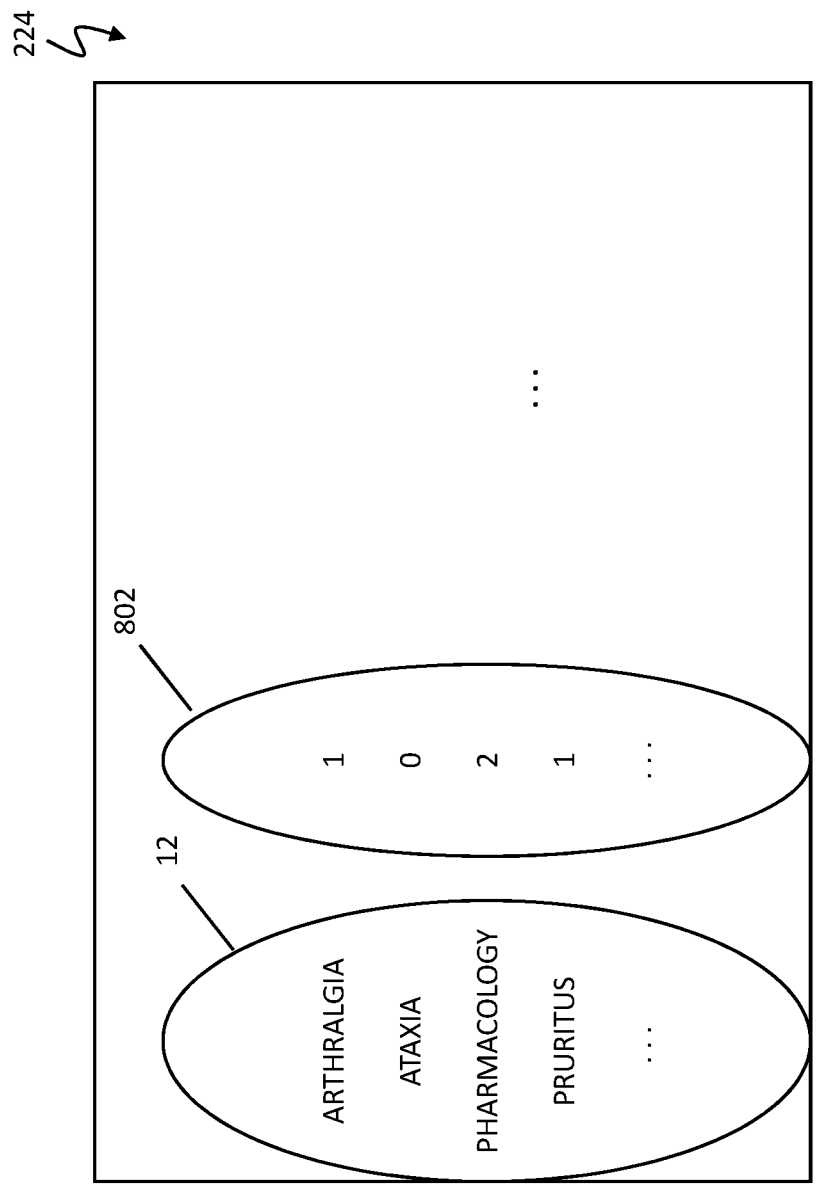
FIG. 8 depicts an example dictionary used for identifying level of aggressiveness according to one or more embodiments of the present invention.

FIG. 8 depicts an example dictionary used for identifying level of aggressiveness according to one or more embodiments of the present invention. The dictionary 224 includes several tags 12 in a first column, and a second column 802 that indicates a level of aggressiveness, i.e., level of disambiguation, associated with each tag 12. The dictionary 224 can include additional columns that are not shown herein.

Referring to the method 700 in FIG. 7, the method 700 includes generating annotations 210 for the input text using the dictionary 224, at block 708. The annotations 210 are generated using one or more known techniques. Further, for each generated annotation (i.e. tag 12), the corresponding level of aggressiveness from the dictionary 224 is compared with the user setting, at block 710. Further, only the annotations that are in the range provided by the user settings are selected, at block 710. For example, if the user setting requests a level of aggressiveness=3, the annotations that have a corresponding level of aggressiveness that is less (or greater) than or equal to the user setting, are selected. In other embodiments of the present invention, an annotation is selected only if the corresponding level of aggressiveness is equal to the user setting. Subsequently, the annotated text using the selected annotations is output, at block 712.

Figure 9:
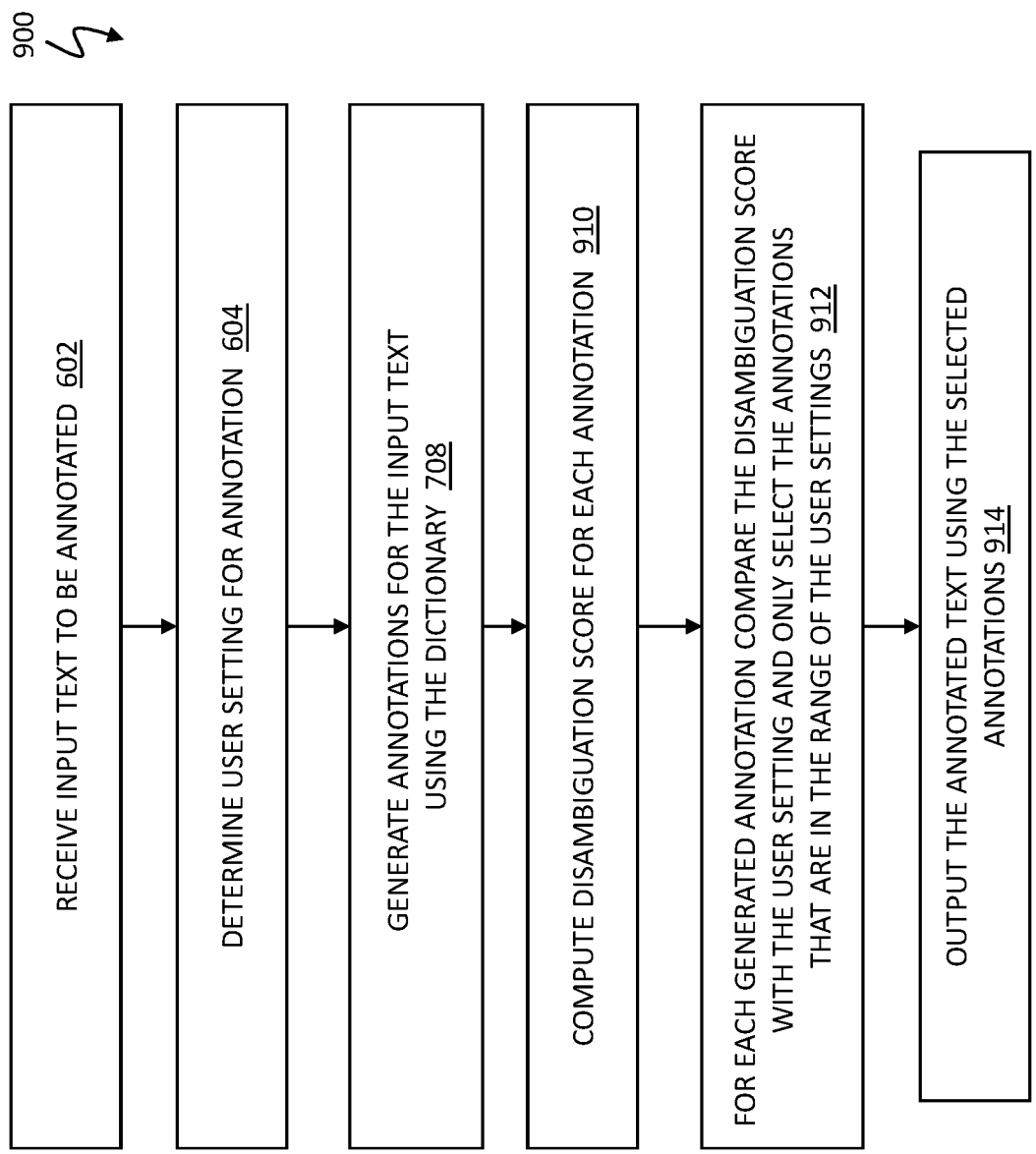
FIG. 9 illustrates a flowchart of a method for configuring precision and recall levels for annotating an input text in accordance with one or more embodiments of the present invention.

FIG. 9 depicts a flowchart of a method 900 for configuring metrics and recall levels for one or more NLP annotators in accordance with one or more embodiments of the present invention. The method 700 includes the operations 602 and 604 as described herein. In this method, the annotator 250 uses a single dictionary 224. The annotator 250 is coupled to a disambiguation service which computes a disambiguation score of each of the generated annotations 210, at block 910. The disambiguation score can be computed using an application programming interface to a disambiguation service. The disambiguation service can be part of the NLP services 212 (FIG. 5). Subsequently, the disambiguation score is compared with the user settings to determine whether an annotation should be created for the element, at 912. In one or more embodiments of the present invention, only the annotations 210 that have a disambiguation score in the range specified by the user settings are selected. The annotated version of the input text is further output, at block 914.

As technical advantages and benefits, one or more embodiments mimic a custom annotation of the input text using specific set of tags based on a user setting for determining a desired aggressiveness level. One or more embodiments of the present invention facilitate configuring an annotator in the NLP system to be more aggressive or conservative in terms of deciding if an element should be annotated based on the client's needs. The aggressiveness level of the annotator can be configured dynamically, and at real-time in some embodiments of the present invention.

Further technical advantages and benefits allow multiple users to each apply their own customized aggressiveness level by selecting a dictionary from a set of dictionaries that are configured at different ambiguity levels. Although one set of dictionaries 224 for a particular user is illustrated in FIG. 4, the dictionaries 224 is representative of numerous custom dictionaries for respective users in which each user can individually apply his/her own dictionary to the corpus 260 and the input text as discussed herein. Additionally, it should be noted that embodiments of the present invention facilitate the user to provide different user settings for different inputs, and thus, annotating different input text with different level of aggressiveness. For example, the user can input a first input text to be annotated at a first user setting (e.g., most conservative), and a subsequently a second input text to be annotated at a second user setting (e.g., most aggressive). It is understood that other combinations of input and aggressiveness levels are possible.

The computer system 202 can implement software as a service in a cloud environment for providing the NLP services for accessing the corpus 260 to augment the input text.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
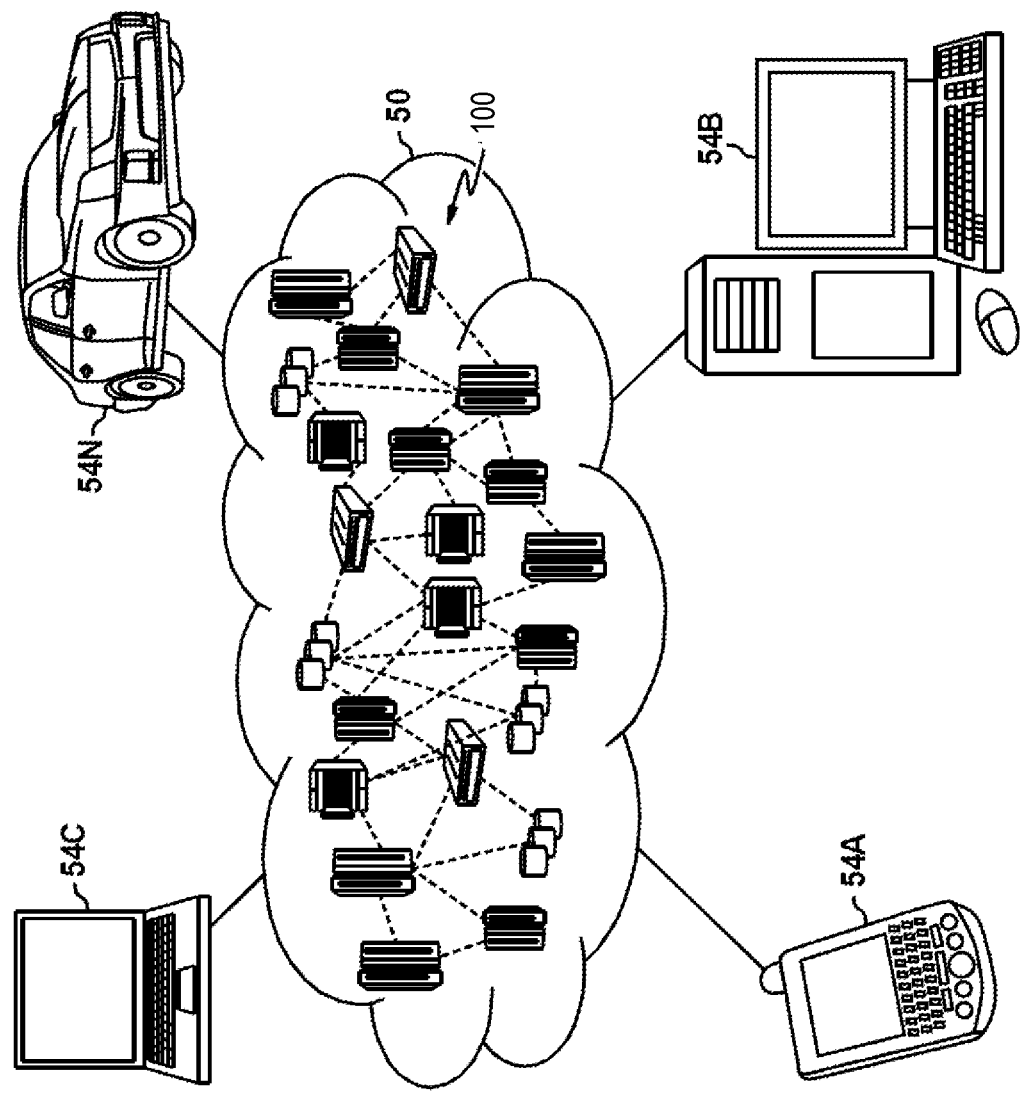
FIG. 10 depicts a cloud computing environment according to one or more embodiments of the present invention.

Referring now to FIG. 10, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described herein above, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 10 and cloud computing environment 50 can communicate with any type of computerized device over any type of network and/or network addressable connection (e.g., using a web browser).

Figure 11:
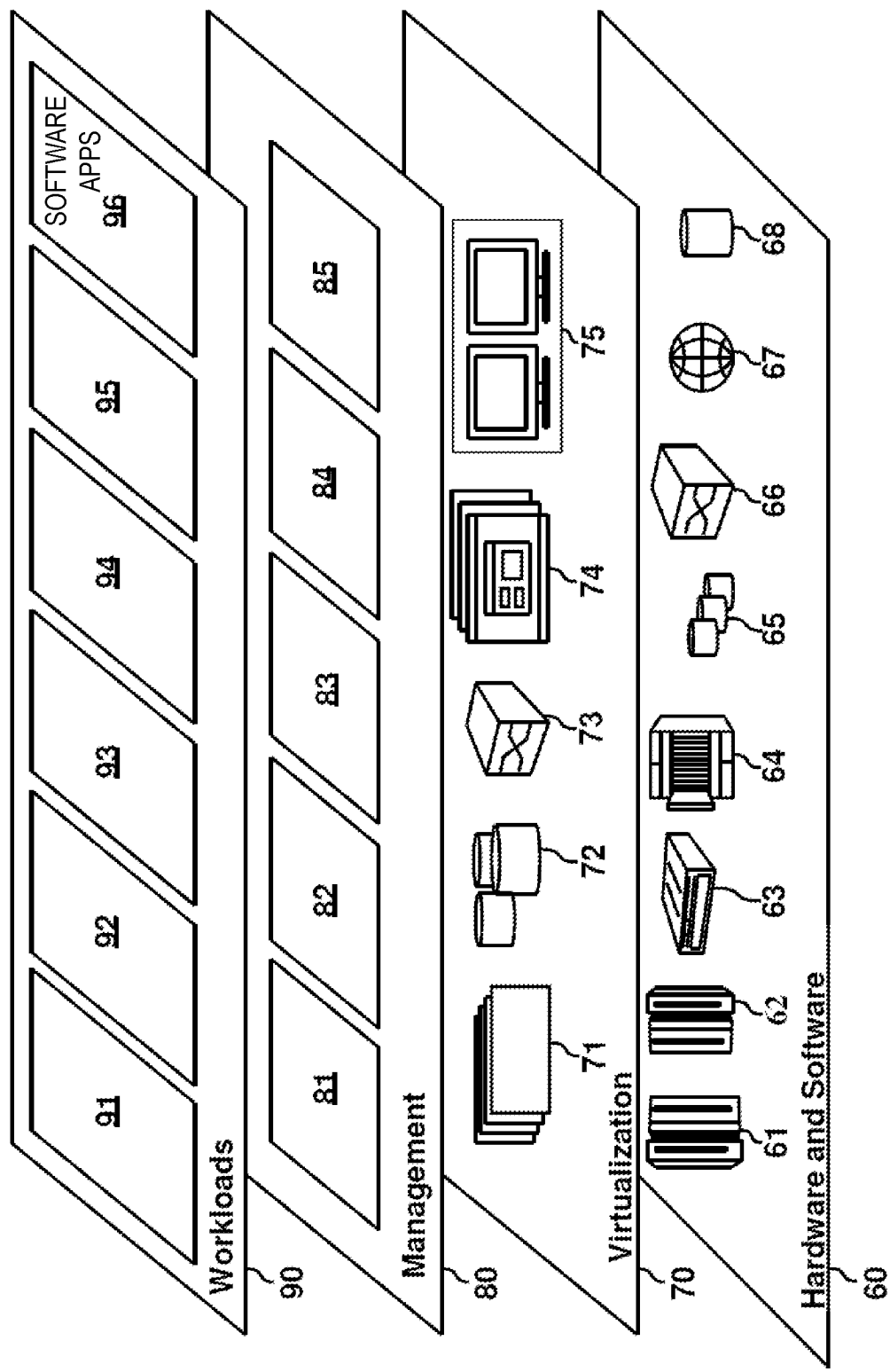
FIG. 11 depicts abstraction model layers according to one or more embodiments of the present invention.

Referring now to FIG. 11, a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and software applications (e.g., software applications 204 and annotator 250) implemented in workloads and functions 96. Also, software applications can function with and/or be integrated with Resource provisioning 81.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
    receiving, by a natural language processing (NLP) annotator, an input text that is to be annotated, the NLP annotator is based on an artificial neural network;
    determining, by the NLP annotator, a user setting that indicates an aggressiveness level of annotation to be used to annotate the input text;
    selecting, by the NLP annotator, from a plurality of dictionaries, a first dictionary based at least in part on the aggressiveness level indicated by the user setting, wherein each dictionary from the plurality of dictionaries is associated with respective aggressiveness levels, and the first dictionary that is selected matches the user setting;
    generating, by the NLP annotator, annotated text of the input text based at least in part on the first dictionary; and
    outputting, by the NLP annotator, the annotated text.

2. The computer-implemented method of claim 1, wherein the aggressiveness level is input specifically for the input text.

3. The computer-implemented method of claim 1, wherein the aggressiveness level is a first aggressiveness level, the computer-implemented method further comprising:
    receiving, by the NLP annotator, a second aggressiveness level of annotation to be used to annotate the input text;
    selecting, by the NLP annotator, a second dictionary corresponding to the second aggressiveness level;
    generating, by the NLP annotator, the annotated text of the input text based on the second dictionary; and
    outputting both, the annotated text based on the first dictionary and the annotated text based on the second dictionary.

4. The computer-implemented method of claim 1, wherein the aggressiveness level changes the precision and recall of the NLP annotator.

5. The computer-implemented method of claim 1, wherein the NLP annotator determines a disambiguation score of an annotation that is generated based on a disambiguation service.

6. The computer-implemented method of claim 1, wherein the NLP annotator determines a disambiguation score of an annotation that is generated based on the first dictionary.

7. A system comprising:
    a memory having computer readable instructions; and
    one or more processors for executing the computer readable instructions, the computer readable instructions controlling the one or more processors to perform operations to annotate text using an artificial neural network-based annotator, the operations comprising:
    receiving an input text that is to be annotated;
    determining a user setting that indicates an aggressiveness level of annotation to be used to annotate the input text;
    selecting from a plurality of dictionaries, a first dictionary based at least in part on the aggressiveness level indicated by the user setting, wherein each dictionary from the plurality of dictionaries is associated with respective aggressiveness level, and the first dictionary that is selected matches the user setting;
    generating annotated text of the input text based at least in part on the first dictionary; and
    outputting the annotated text.

8. The system of claim 7, wherein the aggressiveness level is input specifically for the input text.

9. The system of claim 7, wherein the aggressiveness level is a first aggressiveness level, and the operations further comprise:
    receiving a second aggressiveness level of annotation to be used to annotate the input text;
    selecting a second dictionary corresponding to the second aggressiveness level;
    generating the annotated text of the input text based on the second dictionary; and
    outputting both, the annotated text based on the first dictionary and the annotated text based on the second dictionary.

10. The system of claim 7, wherein the user setting is stored in the memory.

11. The system of claim 7, wherein the aggressiveness level changes the precision and recall of the annotated text that is generated.

12. The system of claim 7, wherein the operations further comprise determining a disambiguation score of an annotation that is generated based on a disambiguation service.

13. The system of claim 7, wherein the operations further comprise determining a disambiguation score of an annotation that is generated based on the first dictionary.

14. A computer program product comprising a computer readable storage medium having program instructions embodied therewith, the program instructions executable by a processor to cause the processor to perform operations comprising:
    receiving an input text that is to be annotated using an annotator that annotates natural language text using an artificial neural network;
    determining a user setting that indicates an aggressiveness level of annotation to be used by the annotator to annotate the input text;
    selecting from a plurality of dictionaries, a first dictionary based at least in part on the aggressiveness level indicated by the user setting, wherein each dictionary from the plurality of dictionaries is associated with respective aggressiveness level, and the first dictionary that is selected matches the user setting;
    generating annotated text of the input text based at least in part on the first dictionary; and
    outputting the annotated text.

15. The computer program product of claim 14, wherein the aggressiveness level is input specifically for the input text.

16. The computer program product of claim 14, wherein the aggressiveness level is a first aggressiveness level, and the operations further comprise:
- receiving a second aggressiveness level of annotation to be used to annotate the input text;
- selecting a second dictionary corresponding to the second aggressiveness level;
- generating the annotated text of the input text based on the second dictionary; and
- outputting both, the annotated text based on the first dictionary and the annotated text based on the second dictionary.

17. The computer program product of claim 14, wherein the aggressiveness level changes the precision and recall of the annotated text that is generated.

18. The computer program product of claim 14, wherein the operations further comprise determining a disambiguation score of an annotation that is generated based on a disambiguation service.

19. The computer program product of claim 14, wherein the operations further comprise determining a disambiguation score of an annotation that is generated based on the first dictionary.

\* \* \* \* \*